United States Patent [19]

Voden, Jr.

[11] Patent Number: 4,730,254

[45] Date of Patent: Mar. 8, 1988

[54] DRILL STRING MAKE-UP AND BREAKOUT TORQUE CONTROL SYSTEM AND APPARATUS

[75] Inventor: Gerre S. Voden, Jr., Evanston, Wyo.

[73] Assignee: Torque Systems, Inc., DeQuincy, La.

[21] Appl. No.: 825,450

[22] Filed: Feb. 3, 1986

[51] Int. Cl.[4] .................. G01L 5/24; E21B 19/00; B25B 23/00

[52] U.S. Cl. ..................... 364/422; 81/467; 173/12; 173/151; 73/862.25

[58] Field of Search ........... 364/422; 29/240; 81/467–483; 173/12, 164, 151; 73/862.25, 862.21–862.24, 862.26

[56] References Cited

U.S. PATENT DOCUMENTS

| | | | |
|---|---|---|---|
| 4,402,052 | 8/1983 | Stone et al. | 29/240 |
| 4,444,273 | 4/1984 | Ruby | 73/862.25 |
| 4,446,745 | 5/1984 | Stone et al. | 73/862.25 |
| 4,501,335 | 2/1985 | Gann | 173/12 |
| 4,507,735 | 3/1985 | Moorehead et al. | 364/422 |
| 4,549,431 | 10/1985 | Soeiinah | 364/422 |
| 4,567,779 | 2/1986 | Byrne | 73/862.25 |
| 4,579,024 | 4/1986 | Coyle, Sr. | 173/12 |

Primary Examiner—Jerry Smith
Assistant Examiner—Allen MacDonald
Attorney, Agent, or Firm—J. David Nelson; Michael D. McCully

[57] ABSTRACT

A system and apparatus for the monitoring and control of torque applied during make-up and breakout of drill string components. The force applied by the cat head to the tong is measured by a hydraulic load cell and the horizontal and vertical angles between the direction of the cat head pull and the longitudinal axis of the tong are measured by angle measuring devices. Force and angle values are used for calculating the correct value of the applied make-up or breakout torque. Force angle, and torque values at shut down or breakout may be displayed, printed and plotted. During make-up, the cat head is automatically disengaged at an instant calculated to achieve a desired make-up torque at the completion of shut down.

11 Claims, 10 Drawing Figures

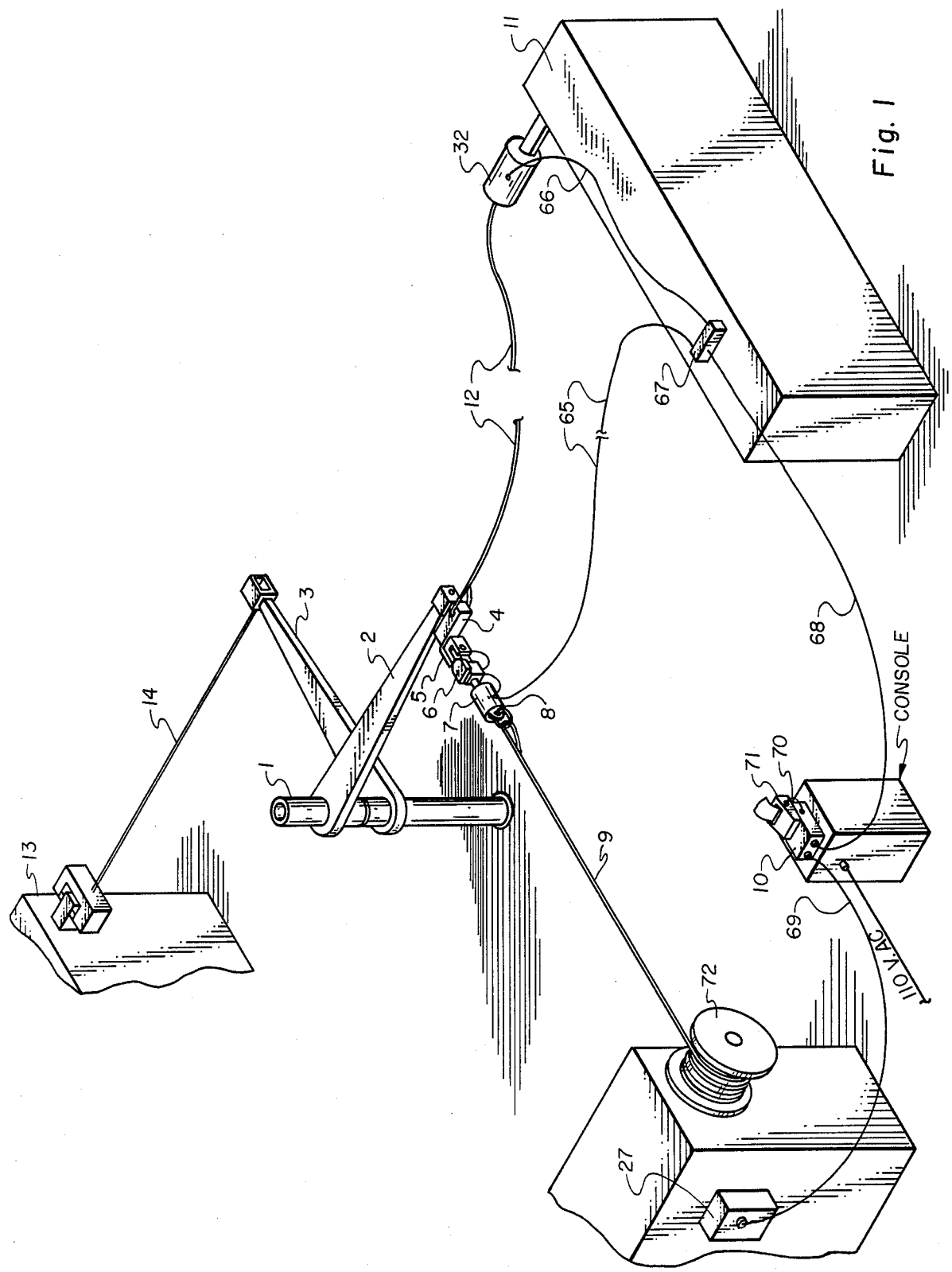

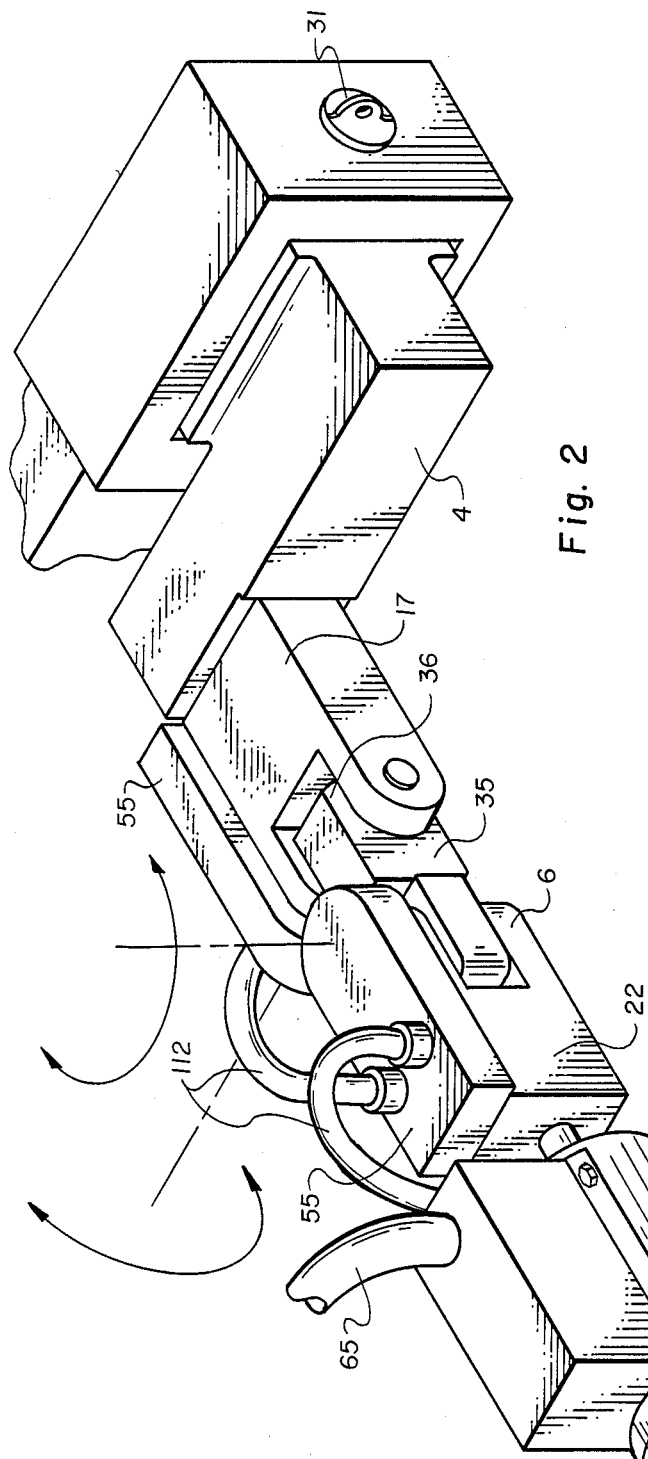
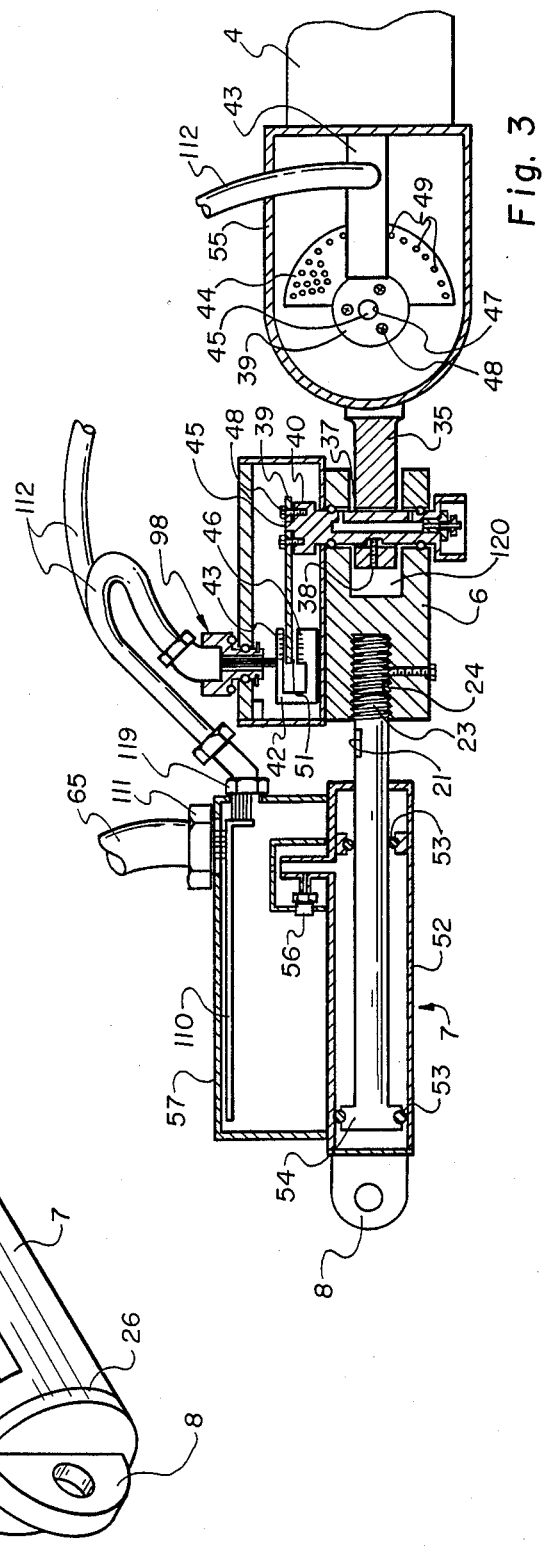

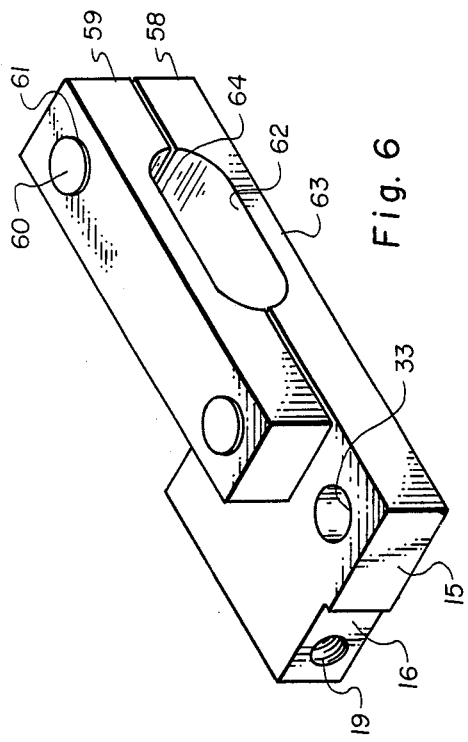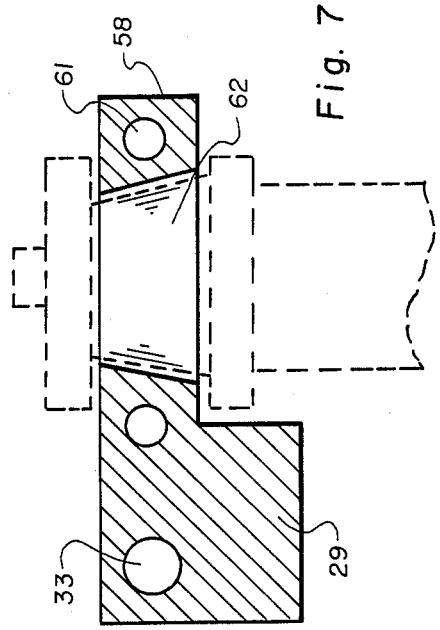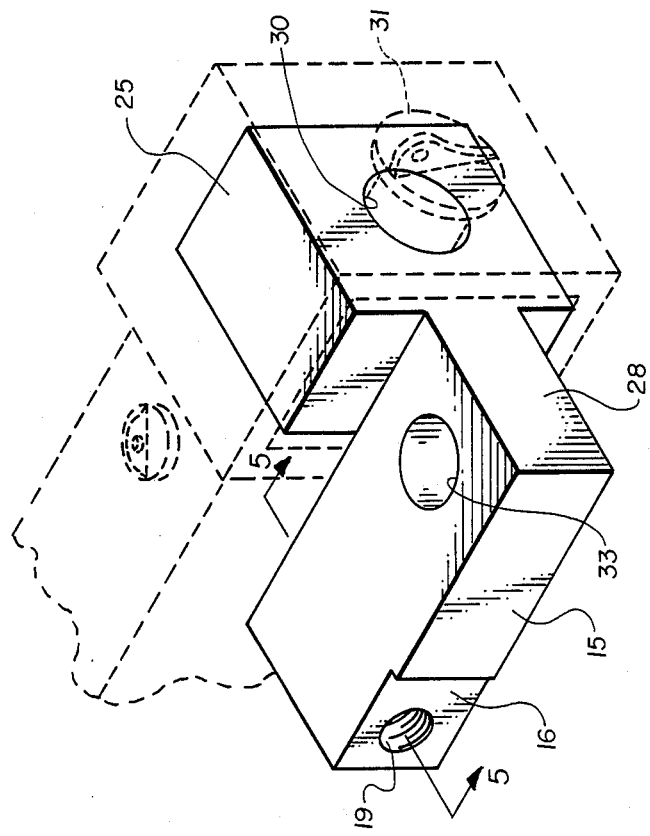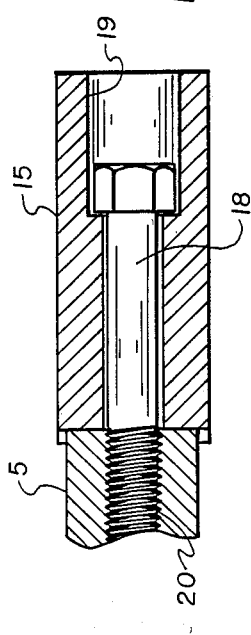

DRILL STRING MAKE-UP AND BREAKOUT TORQUE CONTROL SYSTEM AND APPARATUS

BACKGROUND OF THE INVENTION

1. Field of Invention:

This invention is in the field of torque control devices, particularly the field of torque control devices designed to monitor and control the amount of torque applied by a tong and cat head system during the make-up and breakout of drill collar and drill pipe, and this invention is designed to provide a system and an apparatus for accurately computing the actual applied torque during make-up and breakout, correcting for variations in the vertical and horizontal angles between the longitudinal axis of the tong and the direction of the cat head pull, shutting down the cat head at the instant the desired make-up torque is achieved, and monitoring the actual applied torque during breakout.

2. Prior Art:

The joints in a drill string must be made up with an applied torque within a rather narrow range of torque values. If a joint is not adequately tightened, the joint may lea, and may ultimately result in a crack or a separation of the drill string causing the lower part of the drill string to fall into the well. A very costly recovery operation would then be required to remove the separated portion of the drill string from the well. However, if the make-up torque is too high, the pipe threads may be damaged or the pipe may be overstressed causing its failure and the loss of a portion of the drill string in the well. Again, this would necessitate an expensive recovery operation and a temporary shut down of the well.

The earliest method for use of a tong and cat head for the make-up and breakout of a drill string consisted of the operator manually observing the angular advancement of the tong and the apparent effort being made by the cat head, to determine, on the basis of experience, when the desired amount of torque was being applied. In the case of make-up, when it appeared that the desired torque was achieved, the operator would manually shut down the cat head. In the case of breakout, the operator would merely observe if the breakout torque was apparently greater than the make-up torque that had been applied, thereby observing whether the drill string had received additional torquing in the well, an undesirable condition.

An early advancement from the completely manual system for controlling torque applied by the tong to the drill string was the use of a strain guage or some other form of force measuring device in the line between the cat head and the tong. This would allow the operator to manually observe when the force applied by the cat head approximately achieved the desired maximum. An additional advancement was accomplished through the use of a load sensor which automatically disengaged the cat head clutch when a preset maximum force was exceeded. The main deficiency with this early automated system wa sthat as the tong arm is rotated, the angle between the axis of the tong arm and the direction of pull of the cat head cable varies. Since it is only that component of the force imposed by the cat head which is perpendicular to the axis of the tong and is in the horizontal plane of the tong which imposes torque upon the drill string, the use of the applied force without an angle correction results in an incorrect torque value. If the preset force is that force which would produce the desired make-up torque when the pre-set force is applied in a direction perpendicular to the axis of the tong arm, then more likely than not, the actual torque applied to the drill string at the time of shutdown will be less than the desired torque, since only infrequently will shutdown occur when the angle between the applied force and the tong arm axis is 90°. If the shutdown force is set higher, then the potential for overtorquing the drill string joint is introduced. Also, an additional lesser problem is that frequently the tong will be attached to the drill string in a different horizontal plane than the horizontal plane that the cat head is situated in, thereby introducing a vertical angle which must be corrected for in order to compute the correct torque.

One of the earliest attempts to deal with the need to correct the torque calculation for the variation in the angle between the direction of the applied force and the axis of the tong is illustrated in U.S. Pat. No. 3,693,727 (Bell). This device contains a lever and sensor arrangement attached to the tong which attempts to provide for the direct sensing of that horizontal component of the force applied to the tong by the cat head which is perpendicular to the axis of the tong arm. Inherent problems with this device are lack of accuracy and lack of vertical angle corrections. Another device which attempts to compensate for the variation of the angle between the horizontal axis of the tong and the direction of the applied force is illustrated in U.S. Pat. No. 4,137,758 (Rodland). This device, like the Bell Patent, includes an attachment for the tong arm which allows the horizontal component of the applied force which is perpendicular to the axis of the tong arm to be measured directly. This device uses a load cell which is fixed between the tong arm and an external pivot point which transmits only the perpendicular component of the applied force to the load cell. The accuracy of this device is questionable and again, like the Bell Patent, it is not designed to correct for vertical angle deviations. Neither the device described by the Bell Patent nor the device described by the Rodland Patent provide for determination of the vertical and horizontal angles or the determination of the force actually applied by the cat head, all of which are important for monitoring operator performance.

The device disclosed in the Gann Patent, U.S. Pat. No. 4,501,335, incorporates a device which attaches to the handle of the tong arm and measures the horizontal angle between the horizontal axis of the tong arm and the direction of the applied force, through the use of a universal assembly with shaft oriented vertically and an optical encoder angle measuring gauge attached to the shaft. The tension force is measured with a typical strain guage. Electrical signals from the horizontal angle encoder and the applied force strain guage are used to compute the applied make-up torque. The accuracy of the angle measurement and the force measurement is questionable for this system and, like the other devices disclosed in the prior art, no correction is made or is possible for the vertical angle deviation.

Another significant deficiency of all prior art devices for torque control is related to the tendency of the cat head to continue to torque up the drill string after the cat head solenoid is disengaged. Although complete shutdown is usually accomplished in a fraction of a second, the time lags and inertia of the system can result in significant overtorqueing of the drill string if shut down is initiated just as the maximum desired torque is achieved.

THE PRINCIPAL OBJECTIVES OF THIS INVENTION

The principal objective of this invention is to provide an accurate and reliable system and apparatus for completing the make-up a drill string so as to prevent under-torquing and over-torquing of drill string joints and pipe. An additional objective is to provide a torque control apparatus which is relatively light in weight so that it can be readily installed and operated by one operator. A further objective is to provide a torque control system which, during make-up, will sense, record and plot, versus time, the values at shutdown of the force applied by the cat head, the horizontal and vertical angles between the axis of the tong arm and the direction of the applied force, and the applied torque corrected for the deviation angles, this information being used to evaluate and improve make-up and break-out operations. A further objective is to provide a torque control system which will anticipate the achievement fo the desired torque during make-up, and initiate shut-down of the cat head at an interval of time prior to achievement of the desired torque that will result the system completing the torque-up at the completion of shut-down. A further objective is to provide a system and apparatus which will allow the monitoring, recording and plotting of applied force and applied torque during breakout. A further objective is provide a system which will allow the operator to easily compute the desired make-up torque for the various drill string components including standard and heavy wall drill pipe and drill collars.

SUMMARY OF THE INVENTION

This invention is designed to provide an easily installed and operated torque control apparatus and computerized monitoring and control system for the make-up and breakout of drill string, including drill collar and drill pipe. The torque control device is attached on one end to the handle of a tong by a specially designed tong bracket and is attached on the other end to a standard cat head chain. The apparatus includes vertical and horizontal angle measuring devices which consist of two universal assemblies, one being connected to the tong bracket with its shaft oriented horizontally and the other with its shaft oriented vertically so long as it remains in the same horizontal plane as the tong. The two universal assemblies are connected by a knuckle joint which is secured by set screws to each of the universal assembly shafts and keeps the shafts oriented 90° with respect to each other. Each universal assembly contains an angle sensing device which consists of (a) an angle locator plate which is attached to the end of the shaft which extends beyond the clevis on one side, which plate contains a pattern of holes which is unique for each incremental angular position of the shaft and (b) an angle sensor which consists of a row of infrared emitters and a superimposed row of infrared sensors which are positioned above and below the angle locator plate respectively in a housing with a horizontal slit. As torque is imposed on the drill string the tong rotates and each universal clevis rotate with respect to its shaft. The infrared emitters are energized continuously and the infrared sensors are energized corresponding to the hole pattern in the angle locator plate. The horizontal angle and vertical angle sensors transmit electrical signals to the computerized control system where the angular displacements are determined by the enerization pattern of the infrared sensors.

A hydraulic load cell is connected to the horizontal angle universal assembly and to the cathead chain. This hydraulic load cell is equipped with a pressure transducer which transmits an electrical signal to the computerized control system which is proporational to the internal pressure of the hydraulic load cell. The computerized control system computes the applied force based upon the signal from the pressure transducer.

The computerized control system, usign the horizontal and vertical angles determined from the signals received from the angle sensors, the applied force computed from the pressure transducer signal from the load cell, and the length of the tong, computes the actual torque applied by the tong to the drill string joint being made-up or broke-out. The horizontal and vertical angles, the applied force, and the computed torque at shutdown or break-out are recorded and plotted.

The operator of the torque control system has the ability to quickly compute and pre-select the desired torque to be imposed upon the drill string during make-up and to monitor the torque applied during breakout. The computerized control system disengages the solenoid for the cat head clutch at the proper time to achieve the desired torque at shutdown. The computerized control system performs a real-time curve fitting operation for actual imposed torque versus time and de-energizes the cat head at a time interval prior to achievement of the pre-set torque, computed to achieve the pre-set torque at the instant shut down is complete. Applied force, vertical and horizontal angles, and actual applied torque at shutdown or breakout are displayed, printed and plotted.

BRIEF DESCRIPTION OF THE DRAWINGS

FIG. 1 is a perspective top view schematic of the torque control system and apparatus in the normal configuration for make-up of drill pipe.

FIG. 2 is a perspective top view of the tong bracket, angle measurement devices and tension force load cell as attached to the tong handle.

FIG. 3 is a section view of the tong bracket, angle measurement devices and tension force load cell as attached to the tong handle.

FIG. 4 is a perspective top view of a version of the tong bracket used with a tong with a rectangular loop type handle.

FIG. 5 is a section view detail of the stem of both versions of the tong bracket showing the hole and bolt which secures the bracket to the vertical angle measurement device.

FIG. 6 is a perspective top view of a version of the tong bracket used with a tong with double prong type tong handle.

FIG. 7 is a plan view detail of the version of the tong bracket used with a tong with a double prong type tong handle.

DESCRIPTION OF PREFERRED EMBODIMENTS

Figure 8:
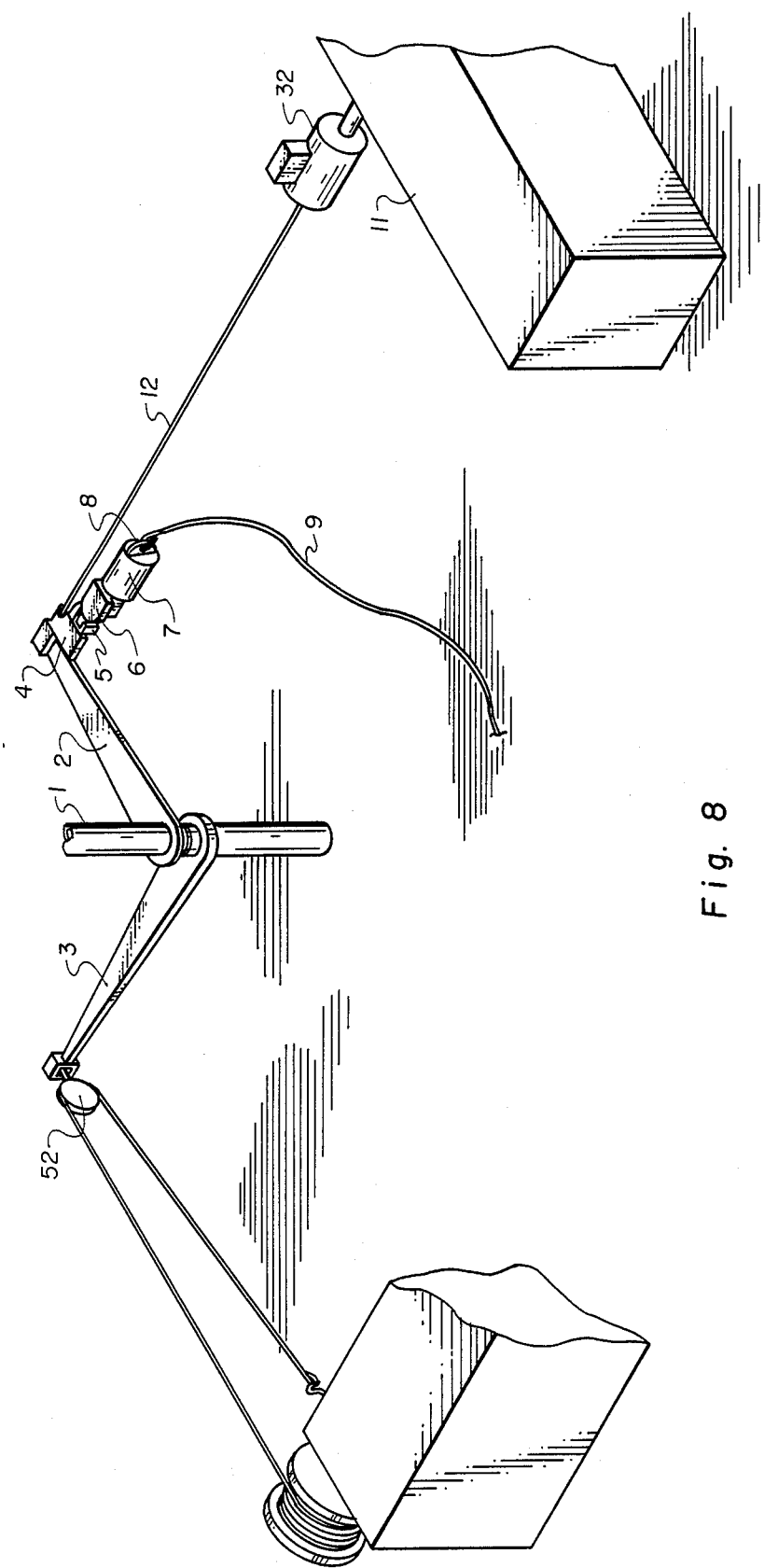
FIG. 8 is a perspective top view schematic of the torque control apparatus in the normal configuration for make-up of drill collar and heavy wall drill pipe.
Figure 9:
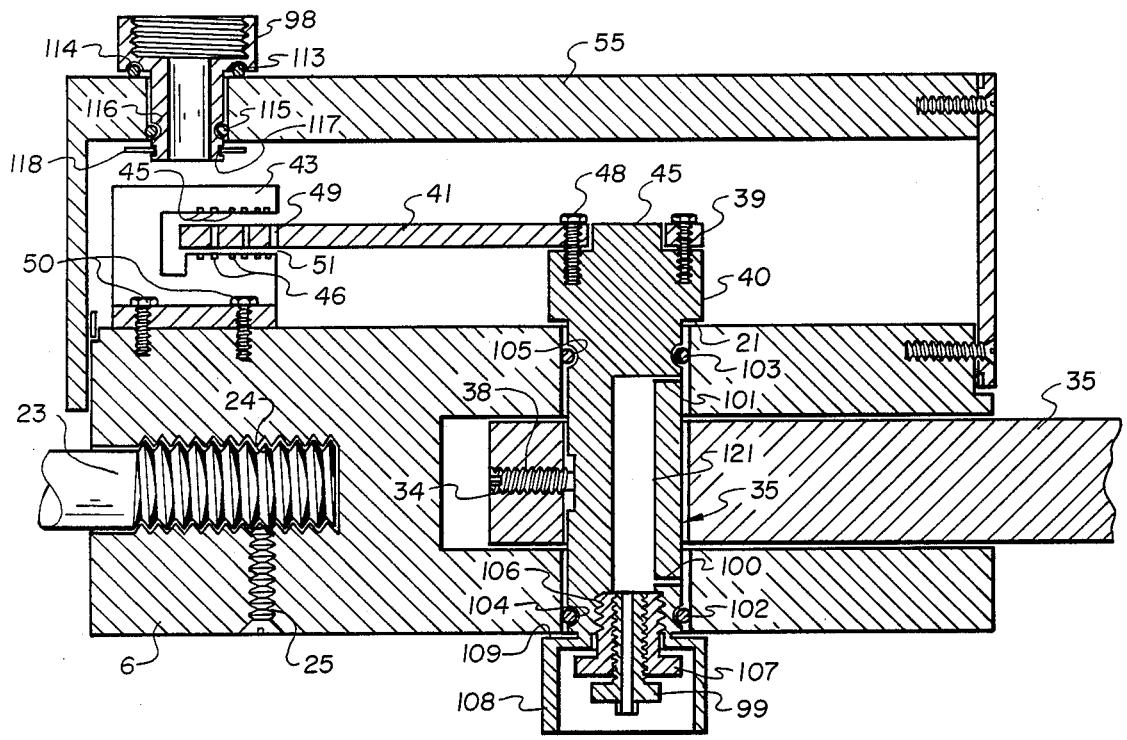
FIG. 9 is a section detail of the horizontal angle measurement devices.

A preferred embodiment of the torque control system and apparatus for drill string make-up and breakout is shown in FIG. 1 in the normal configuration for the make-up of drill pipe 1. This system and apparatus is designed for use with a tong pair 2, 3 with the top tong 2 being the make-up tong and the bottom tong 3 being the back-up tong in this configuration. The main components of this system and apparatus include a tong bracket 4, vertical 5 and horizontal 6 angle measurement devices, a low-range tension force load cell 7, a clevis 8 for connecting to the low-range cat head chain or cable 9, and a computerized control system 10. The high range load cell 32 which is inactive in this configuration is attached directly to a drill platform anchor wall 11 and is loosely connected to the tong bracket 4 with the high-range cable 12. In this configuration the back-up tong 3 is attached to a drill platform anchor wall 13 by a snub line cable of fixed length 14, which is attached to the tong 3. The snub line cable is attached to the anchor wall 13.

The tong bracket 4 can be designed and constructed as shown in FIG. 4 for use with a tong with a rectangular loop type handle such as a Wooley Tong, Type A, or as shown in FIG. 6 for use with a tong with a double prong type handle such as BJ Hughes, Type DB Tong. Referring to FIG. 2, the clevis 17 of the vertical angle universal assembly of the vertical angle measurement device 5 is connectied to the tong bracket by a bolt 18 FIG. 5 which is recess mounted into a hole 19 in the stem of the bracket 15 and threaded into the vertical angle measurement device 20.

The low-range force load cell is connected to the clevis 22 of the horizontal angle measurement device 6 by threading the exteriorally threaded protrusion 23 of the low-range tension force load cell into the threaded receptacle 24 of the clevis 22 of the horizontal angle measurement device. The load cell is connected to the cat head chain or cable 9 by a receptacle 8 which is connected to the load cell by a weld 26. The cat head chain 9 is wound around and is energized by the cat head drum 72.

The computerized control system 10 receives electrical signals from the horizontal angle 6 and the vertical angle 5 measuring devices and from the low-range load cell 7; computes the horizontal and vertical angle measure between the longitudeinal axis of the tong and the direction of the tension force applied by the cat head, the tension force applied by the cat head, and the make-up torque applied to the drill string corrected for angular displacement of the tong; and shuts down the solenoid 27 which disengages the cat head clutch at a time interval in advance of achievement of the pre-selected make-up torque value, which time interval is calculated to result in the achievement of the pre-selected make-up torque at the instant shutdown is complete. At the option of the operator, the control system 10 will print and/or plot the horizontal and vertical angles, the applied tension force, and the actual make-up torque at shut down. This information is used by the operator to evaluate and improve operation, and for the evaluation of operator performance.

Except when the vertical angle is 0°, the angle measured by the horizontal angle measurement device 6 is not a true horizontal angle and except when the angle of the horizontal angle measurement device is 90°, the angle measured by the vertical angle measurement device is not the true vertical angle between the axis of the tong and the direction of the cat head force. However, the control system 10 software is designed to correctly utilize the angles measured by these devices to compute the horizontal component of the force whichis also perpendicular to the longitudinal axis of the tong.

The version of the tong bracket 28 which is designed for use with a rectangular loop handle such as a Wooley Tong, Type A is ordinarily machined in one piece from high strength steel and is constructed in an "L" configuration. The width and thickness of the base 25 of the bracket 28 which is inserted in the tong handle are only slightly less than the corresponding inside dimensions of the tong handle so as to provide only the minimum tolerance needed to allow the bracket to be inserted in the handle without substantial friction resistance. The base 25 of the bracket 28 has a horizontal hole 30 drilled through its center so that the axis of the hole lines up with the axis of the hole which is ordinarily constructed in tong handles of this type, which hole is aligned with the longitudinal axis of the tong and extends from the outside end of the tong through the handle into the shaft of the tong arm. The diameter of the hole 30 in the bracket is the same diameter as the hole in the end of the tong handle and provides for a close tolerance with the bolt 31 which secures the tong bracket to the tong. The bracket also has a vertical hole 33 for the attachment of a clevis or bracket arrangement to connect the cable 12 for the high-range load cell 32.

The portion 16 of the face of the stem 15 of the bracket which is mated with the clevis 17 of the vertical angle measurement device 5 is recessed to prevent rotation of the vertical angle device when it is secured to the bracket 28 by the bolt 18. The stem 28 of the tong bracket has a hole 19 extended horizontally through the stem which is enlarged on the side opposite the recessed face 16 to allow the bolt 18 to be countersunk.

The angle measurement devices 5, 6 utilize universal assemblies and are connected together by a knuckle joint 35, all ordinarily machined from high strength steel. The knuckle joint is ordinarily constructed in one piece and in form is two rectangular solids with rounded exterior ends 36, attached end to end and rotated 90° with respect to each other about their common longitudinal axis. The thickness of each end of the knuckle joint is only slightly less than the inside clearance of each universal assembly to minimize play. The knuckle joint 35 has a hole 37 drilled thorugh each end only slightly greater in diameter than the diameter of the shafts of the universal assemblies. The depth of the slot 120 in the universal assemblies is large enough to provide adequate clearance for a 180° rotation of the knuckle joint with respect to each the universal assemblies. Each end of the knuckle joint is interiorally threaded 34 for a set screw 38 which is used to secure the shaft of each angle measurement device to the knuckle joint so that each shaft rotates with the knuckle joint.

One end of each shaft 40 extends beyond the face of its universal clevis a sufficient distance for the attachment and proper operation of an angle locator plate 41 and an angle sensor 42. This portion of the shaft 40 is enlarged to provide a bearing surface 21 for the top of the universal clevis.

The angle locator plate 41 is a thin metallic plate with a circular center portion 39 approximately equal in diameter to the diameter of the enlarged portion of the shaft 40, and a semi-circular outer portion 44 with the same center of curvature. The end of each shaft to which the angle locator plates are attached has an additional circular extension 45 of a reduced diameter on the end of the shaft to function as an alignment tab for the angle locator plate. The angle locator plate has a circular hole 46 centered about its center of curvature with a diamter only very slightly larger than the shaft extension 45 so that the angle locator plate fits snugly around the shaft extension. The angle locator plate is secured to the top of the shaft by three screws 48.

Each angle locator plate 41 has an arrangement of small holes 49 organized along rays from the center of curvature. The angular displacement between each line of holes is uniform and depends upon the angular resolution desired. Along each line of holes there are selected positions, ordinarily six or more, again depending upon the angular resolution desired, which are an equal radial distant apart, each position either with or without a hole. The pattern of holes 49 for each ray and angular position is unique, permitting determination of the angular position of the plate by examination of the hole pattern.

Each angle sensor 42 consists of a housing 43, a row of infrared emitters 45, and a row of infrared sensors 46, ordinarily operating in the 160 to 320 nanometers wavelength band width. The housing 43 is ordinarily constructed of alumunum or steel in a "C" configuration, with a uniform horizontal slot 51 extending into the housing a distance slightly greater than the radial distance from the outer edge of the shaft 40 to the outer edge of the angle locator plate 41. Each housing 43 is attached to its universal clevis 17, 22 with screws 50, positioned so that its longitudinal axis is aligned with the longitudinal axis of the universal clevis. The angle locator plate 41 is inserted in the slot 51 of the housing 43. The width of the slot 51 is only slightly greater than the thickness of the angle locator plate, providing a close fit between the angle locator plate and the angle sensor housing 43. The center line of the slot 51 is the same distance above the face of the universal clevis 17, 22 as the center line of the angle locator plate 41, as mounted on the extended universal shaft 40. The infrared emitters 45 are flush mounted in the housing 43 on the top side of the slot along a ray alignment from the center of the shaft, with the emitters 45 being equal in number and spaced so as to align with the hole positions 49 on the angle locator plate 41. The infrared sensors 46 are flush mounted in the housing on the bottom of the slot aligned with and immediately below the hole positions in the angle locator plate and the corresponding positions of the infrared emitters 45. With the infrared emitters 45 energized, the pattern of energization of the infrared sensors 46 corresponds to the aligned pattern of holes in the angle locator plate 41, thus corresponding to the rotation angle of the universal clevis 17, 22 with respect to its respective shaft 40.

Each angle sensing device is completely enclosed by an outer housing 55 to protect it from impact damage, moisture and grime from the inherent rough usage on a drill platform. Each outer housing 55 has a specially designed swivel fitting 98 which allows the conductor cables 112 to swivel as the angle measurement devices 5, 6 rotate, thereby reducing the stress and wear on the cables 112 and the electrical connectors. The "O" rings 113, 115 fit in grooves 114, 116 in the swivel fitting 98 and provide a moisture and oil tight seal. A snap ring 118 fits in the groove 117 to secure the swivel fitting 98 in place.

The shaft of each angle measurement device has a hole 121 extending from a lubrication zert 99 which is threaded into a threaded portion 106 of the hole 121 on the bottom to two lubrication ports 100,101 which allow the contact surfaces between the universal clevises and the shafts to be lubricated. Two "O" rings 102, 103 fitted in grooves 104, 105 around the periphery of the shaft confine the lubrication fluid. The outer nut 107 of the zert 99 secures the hood 108 which protects the zert and provides a bearing surface 109 with the bottom of the universal clevis.

For the drill pipe make-up configuration shown in FIG. 1, the low-range tension force load cell 7 is used. The low-range tension force load cell will ordinarily be designed to operate up to a maximum pressure of at least 10,000 p.s.i. The maximum force normally needed for standard drill pipe make-up is approximately 10,000 pounds which, with a four foot tong permits application of up to 40,000 foot pounds of torque. This is a maximum torque ordinarily needed with the heaviest of the wall thicknesses for standard drill pipe. For the make-up of heavy wall drill pipe and drill collar the high-range load cell 32 is utilized in the configuration shown in FIG. 8. The high range load cell 32 is designed for a maximum pressure up to 20,000 p.s.i. With the larger cylinder and piston diameter in the load cell and a pulley arrangement 52 on the cat-head cable, an applied force of up to approximately 40,000 pounds can be achieved. This will allow a maximum applied torque of up to 160,000 foot pounds with a four foot tong. This exceeds the maximum make-up torque required for drill collar and heavy wall drill pipe which is ordinarily approximately 140,000 foot pounds. Because of the substantially higher weight of the high range load cell 32, this load cell is designed for use on the back-up tong during make-up or breakdown and is attached directly to a drill platform anchor wall 11 and the cat-head cable or chain is attached directly to the make-up or breakdown tong as shown in FIG. 8. A pulley system 52 is used as needed to increase the applied force and resultant applied torque. The configuration shown in FIG. 8 using the high-range load cell 32 does not provide for angle corrections to the applied force but the length of the cable 12 can be selected to minimize the horizontal angle error. Also, by setting the tong up in the same horizontal plane as the high-range load cell, the vertical angle error can be minimized. While the configurations shown in FIG. 1 and FIG. 8 are make-up configurations, they can both be used for breakout by simply moving the upper tong to the bottom pipe or drill collar and the bottom tong to the upper pipe or drill collar.

Although both the low range 7 and high range 32 load cells are applications of well-known technology, the maximum operating pressures of 10,000 p.s.i. and 20,000 p.s.i. respectively are substantially higher than usual. The high operating pressures are needed in order to reduce the weight of the load cell. It is particularly essential that the low-range load cell 7 be operated at the higher than normal pressure to keep the weight down since it is attached to the tong and must therefore be handled by the operator. In order to achieve a desired higher level of accuracy with these higher pressures, the barrel 52, seals 53, and piston 54 must be machined to a very low tolerance. The load cells 7, 32 are equipped with a diaphragm type pressure transducer 56, 56a, 56b to produce an electrical signal proportional to the internal pressure of the load cell. While the internal pressure of the load cell is roughly directly proportional to the applied force, a look-up table or polynomial equation is programmed into the computerized control system 10 to accurately convert load cell pressure to applied force. The look-up tables or polynomial equations is determined by actual field testing of the load cells. The low range load cell 7 ordinarily has an externally threaded protrusion 23 and is secured to the horizontal angle measuring device 6 by threading it into the threaded receptacle 24 and securing it in place with the set screw 25. A housing 57 is required over the pressure transducer 56 to prevent damage during normal heavy use on the drilling platform and to provide a protected environment for the terminal strip 110 where the angle sensor and pressure transducer signals will be interfaced with the main cable 65 to the control system 10. The housign is sealed air tight and filled with nitrogen to prevent moisture damage. The housing will be equipped with a cable connector 111 for cable 65 and cable connector 119 for cable 112. The load cell will ordinarily be equipped with a clevis receptacle 8 for attachment of the cat-head chain. The receptacle 8 will ordinarily be welded 26 to the load cell 7.

The tong bracket may also be designed and constructed as shown in FIG. 6 for use with a tong with a double prong type handle such as BJ Hughes Type DB Tong, in which case the bracket is constructed in two pieces, a bottom assembly plate 58 and a top assembly plage 59, installed around the tong handle and joined together by two bolts 60 installed in aligned holes 61 joining the two plates 58, 59 together. The bottom assembly plate 58 is L-shaped with a tapered horizontal groove 62 in the base 63, the axis of which is perpendicular to the longitudinal axis of the base 63. The groove 62 has a semi-circular cross-section and the tapering of the groove 62 matches the tapering of the tong handle in pitch and cross-section and the width of the base 63 is no greater than the longitudinal space between the prongs of the tong handle. The top assembly plate 59 is in the form of a rectangular solid normally of the same width and thickness as the base 63 of the bottom assembly plate 58 with a matching tapered groove 64 for the tong handle which is a mirror image of the groove 62 in the bottom assembly plate 58. The stem 15 of bottom assembly plate has a recessed face 16, bolt hole 19, bolt 18, and hole 33 which are similar to that described for the tong bracket 28 for the rectangular loop type tong handle.

The electrical hardward components of this torque control system and apparatus consist of the vertical and horizontal angle sensors 42, 42a, 42b the low range 7 and high range 32 tension force load cell pressure transducers 56 (56a, 56b), conductors 112, 65 for on/off signals for each infrared sensor in the angle sensing devices, conductors 65, 66 for the analog signal from the pressure tranducers for the low-range and high-range tension force load cells respectively, a junction box 67 for the angle sensor and load cell conductors, conductors 68 to the computerized control system 10, conductors 69 to cat head air valve solenoid 27, conductors 70 to the remote line printers and plotters 71.

The computerized control system 10 performs the following operations:

a. allows the operator to compute the optimum make-up torque for the various drill string components, including standard drill pipe, heavy wall drill pipe and drill collar, based upon the physical characteristics of the components. This eliminates the need for looking up values in tables and interpolating between table values.

b. from a programmed look-up table determines the instantaneous vertical and horizontal angles between the longitudinal axis of the tong and the direction of the applied force, based upon the on/off signals from the infrared sensors and converts the signals to digital angle values. The value of the "horizontal" angle is not a true horizontal angle unless the vertical angle is 0° and the value of the "vertical" angle is not the true vertical angle for the applied force unless the horizontal angle is 90°, but the correct horizontal component of the applied torque which is perpendicular to the longitudinal axis of the tong is computed using these angles.

c. from the analog signals from the pressure transducer, generates from programmed look-up tables or polynomial equations, digital values for the instantaneous applied tension force.

d. computes actual applied torque using the computed tension force and the "horizontal" and "vertical" angles with shpherical corections also being made to correct for the errors which otherwise would be introduced due to the application of the force through the angle measurement devices rather than at a point on the longitudinal axis of the tong.

e. during make-up performs a real-time curve fitting operation at time intervals of no greater than 0.001 second for the applied torque and thereby computes and anticipates the time interval in advance of achievement of the desired make-up torque at which the cat head solenoid for the clutch air valve must be disengaged to achieve the desired torque at the instant shut down is completed, taking into account the lag time and inertia of the system at the time shut down is initiated and thereby preventing over torquing of the drill string.

f. by disengaging the cat head solenoid shuts down the cat head during make-up in accordance with the anticipatory computations made under (e) above.

g. controls printers and plotters to allow the operators to print and/or plot, for make-up and breakout operations using the configuration shown in FIG. 1 the applied force, actual applied torque with angle corrections, and "horizontal" and "vertical" angles between the longitudinal axis of the tong and the direction of the applied force at shut down or breakout, and to print and/or plot, for operations using the configuration shown in FIG. 8, applied force and actual applied torque at make-up or breakout.

Figure 10:
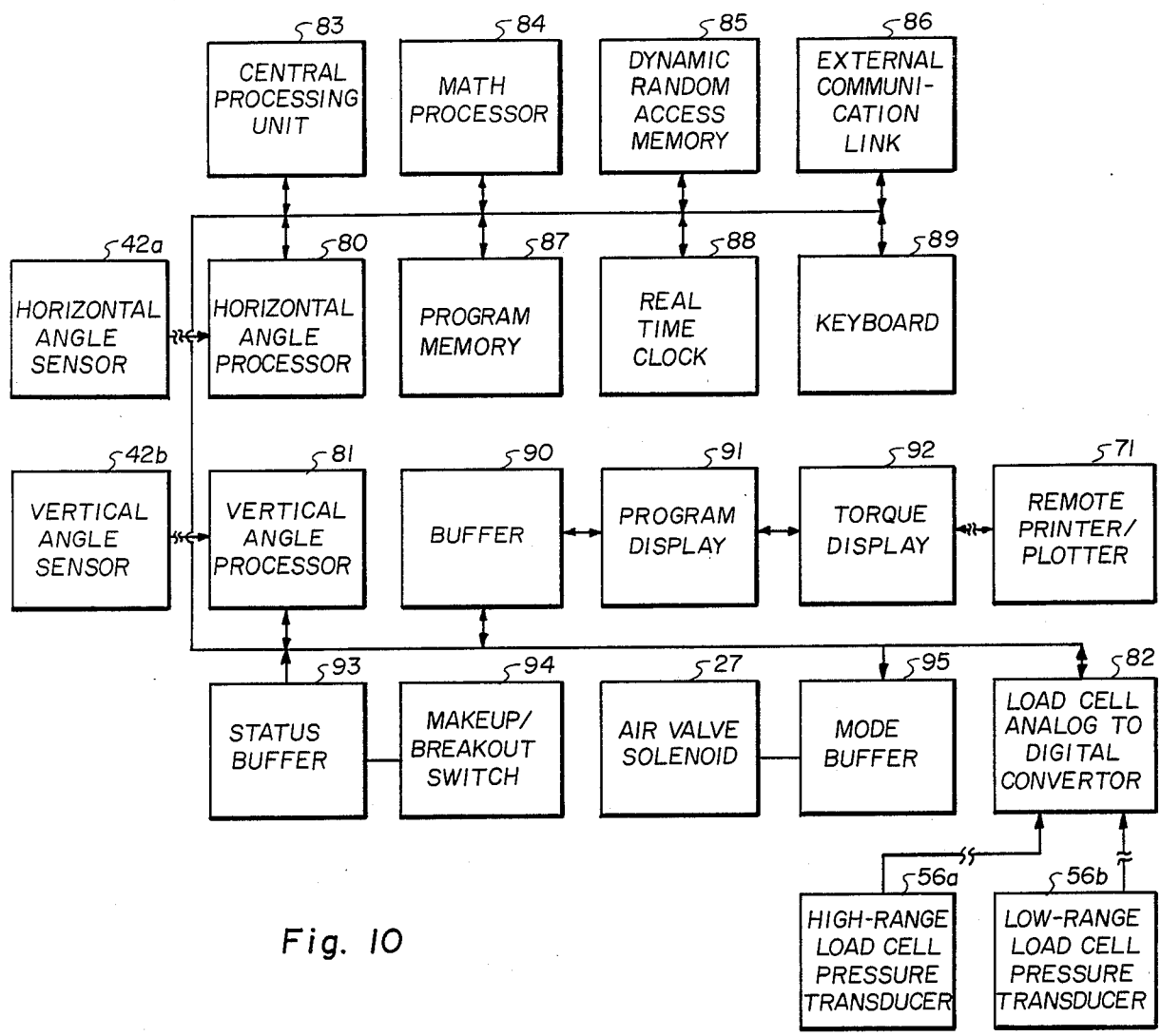
FIG. 10 is a block diagram of the computerized control system.

A block diagram for the computerized control system 10 is shown in FIG. 10. The horizontal and vertical angle infrared sensor on/off signals are received by the horizontal angle 80 and vertical angle 81 processors respectively which determine the horizontal and vertical angles through the use of programmed look-up tables. The analog signal from the pressure transducer that is being used is received by the load cell analog to digital converter 82 which computes the applied tension force using a pressure versus tension force look up table or polynomial equations determined by actual testing of the load cells.

The principal computational components consist of the central processing unit 83, the math processor 84, the dynamic random access memory 85, and the program memory 87. The central processing unit 83 is a microprocessor which uses system software instructions stored in program memory 87 and the math processor 84 to make mathematic computations required by the central processing unit 83, thereby minimizing the cycles in and out of memory 85 and greatly increasing the speed of the mathematical computations. Using the horizontal angle and vertical angle computed by the angle processors 80, 81, the low-range load cell tension force computed by the load cell analog-to-digital converter 82 and the length of the moment arm, which for the FIG. 1 configuration is the distance from the center of the drill string to the center of the vertical angle universal assembly, and which is pre-set by the operator using the keyboard 89, the actual effective make-up torque is computed. In the high-range configuration shown in FIG. 8, the high-range load cell 32 is connected to the snub line 12 and the angle measurement devices 5, 6 and the low-range load cell 7 are inactive and the horizontal angle between the longitudinal axis of the tong and the direction of the applied force is maintained as near as possible at 90°. Also, the backup tong is set-up on the drill string in the same horizontal plane as the high range load cell 32, therefore no vertical angle corrections are necessary. The actual applied make-up torque is computed by the central processing unit by using the tension force computed by the load cell analog to digital converter and the length of the moment arm, which for the FIG. 8 configuration is the distance from the center of the drill string to the center of the hole 33 where the high-range load cell snub line 12 connects to the tong bracket. The length of the moment arm for the high-range configuration is input by the operator at the keyboard 89.

The high-range configuration FIG. 8 is used for the breakout of the drill string, with the tong 3 which is connected to the cat head being placed on the top pipe and the tong 2 connected to the snub line 12 being placed on the bottom pipe. The breakout torque is computed in the same manner as for the make-up torque in the high-range configuration.

In all configurations all calculations are done in real time as date and time data are generated by the real time clock 88 for the central processing unit 83.

The operator will compute at the keyboard 89 the desired make-up torque for the type of drill string component being made up. As make-up is accomplished for each joint, the make-up torque is calculated at time intervals of no greater than 0.001 seconds. The software contained in the program memory 87 provides for the fitting of a polynomial equation to the torque versus time computations and thereby provides for the computation of the time interval in advance of achievement of the desired torque that the cat head solenoid 27 must be disengaged to achieve the desired torque just at the instant shutdown is complete. The operator must input, at the keyboard 89, the time constant for the cat head system for the time between solenoid disengage and cat head clutch disengage. This value must be determined by periodic testing of the cathead. The mode buffer 95 provides for the conversion of the central processing unit 83 electronic signed to the operational voltage needed to trip the air-valve solenoid 27. The control system shutdown override is reset, after a programmed time interval, normally 4 seconds, after shutdown, and operator control is then restored.

The buffer 90 likewise provides the link between the central processing unit 83 and the program display 91, the torque display 92, where the torque values at shutdown or breakout are displayed for the operator, and the remote printer/plotter where the torque values at shutdown or breakout are printed or plotted, along with the horizontal and vertical angles at shutdown or breakout when operating in the low-rang configuration, the force applied by the cat head at shutdown on breakout, and the time and date of shutdown or breakout. Also, if the cat head stalls for more than a pre-set interval (normally 4 seconds), indicating that the operator has allowed the angle between the axis of the tong and the direction of the cat head force to depart substantially from 90° at a time when the desired make-up torque is nearly achieved resulting in failure of the cat head to complete makeup, the cat head is shut down and the applied torque, horizontal and vertical angles, applied force, and time and date are printed and/or plotted. This data will be helpful in evaluating operator performance.

The operator manually selects either the make-up or the breakout mode by the manual make-up/breakout switch 94 which is linked with the central processing unit 83 by the status buffer 93. In the breakout mode the automatic disengage software is not utilized, but the tension force and torque displaying and printing/plotting functions are utilized. The external communication link 86, which will normally be two RS 232 communication channels, allows for communications between the control system 10 and other computers or remote terminals. This is essential for debugging of the system software and program changes and updates.

I claim:

1. A drill string make-up and breakout torque control system and apparatus for use with a cat head system, including clutch operated drum and chain or cable for force generation, and a tong for torque application comprising:

(a) means for measuring the instantaneous force generated by the cat head system and applied to the tong:

(b) means for measuring the instantaneous vertical and horizontal angles between the direction of the force applied by the cat head system to the tong and the longitudinal axis of the tong;

(c) means for connecting the force measuring means and the angle measuring means to the tong and the cat head chain or cable;

(d) means for computing the torque applied to the drill string by the tong, utilizing the length of the tong to the point of the force application, the force applied to the tong as measured by the force measuring means, and the vertical and horizontal angles between the direction of the applied force and the longitudinal axis of the tong as measured by the vertical and horizontal angle measuring means;

(e) means for computing a shutdown time interval in advance of achievement of a pre-selected make-up torque at which shutdown of the cat head must be initiated to achieve, within an allowed tolerance, the pre-selected make-up torque at the instant shutdown of the cat head system is complete;

(f) means for automatically disengaging the clutch of the cat head, when the shut down time interval is reached during make-up of the drill string; and (g) means for displaying, printing and plotting applied force, horizontal and vertical angles between the direction of the applied force and the longitudinal axis of the tong, actual make-up torque, and date and time at cat head shutdown or breakout.

2. A drill string make-up and breakout torque control system and apparatus as recited in Claim 1 wherein the means for measuring said instantaneous force generated by the cat head system and applied to the tong comprises:
- (a) a hydraulic load cell;
- (b) an electronic pressure transducer for measuring the internal hydraulic pressure of the load cell and;
- (c) means for computing, displaying, printing and plotting the tension force using an electrical signal from the pressure transducer.

3. A drill string make-up and breakout torque control system and apparatus as recited in claim 2 wherein the means for measuring the instantaneous vertical and horizontal angles between the direction of the force applied by the cat head system to the tong and the longitudinal axis of the tong comprises two universal assemblies the shafts of which are connected together by a knuckle joint with the axis of each shaft oriented 90° with respect to the other, one end of the shaft of each universal assembly extending beyond the clevis with a rotating plate attached to the shaft, each plate having radial patterns of holes which pattern is unique for each incremental angular position of the plate, each universal assembly having an arrangement of infrared emitters and sensors attached to its clevis and situated above and below the rotating plate respectively, the energization pattern of the infrared sensors corresponding to the hole pattern of the rotating plate, and the electrical energization signals of the infrared sensors being used to compute, display, print and plot angular positions of each universal assembly shaft.

4. A drill string make-up and breakout torque control system and apparatus as recited in claim 2, wherein the means for measuring the vertical and horizontal angles between the longitudinal axis of the tong and the direction of the force applied by the cat head comprises:
- (a) a combination of two universal assemblies with their shafts connected together by a knuckle joint which is firmly attached to each shaft with the shafts oriented at 90° with respect to each other, the shaft of the universal assembly which is connected to the tong being oriented horizontally, each universal assembly shaft being extended and enlarged in diameter on one end beyond the outside face of the clevis, and each shaft having a means for lubricating the contact surfaces between the shaft and its clevis;
- (b) two angle locator plates, one attached to the end of each extended and enlarged universal assembly shaft, each plate being thin and flat with a full circular center portion approximately equal in diameter to the diameter of the extended and enlarged portion of the universal shaft and a semi-circular outer portion with radial patterns of holes presenting a unique pattern of holes at each angular position of the shaft of a selected interval, the hole positions at each incremental angular position of the plates being uniform radial distances apart, each hole position being with or without a hole at each specific angular position;
- (c) two angle sensors each comprising a row of infrared emitters and a row of an equal number of infrared sensors with the infrared emitters and infrared sensors mounted above and below each angle locater plate respectively in a slotted housing with each infrared sensor being located under an infrared emitter, each housing being attached on the side of the universal clevis containing the extended shaft to which the angle locator plate is attached, the infrared emitters and infrared sensors being flush mounted on the top and bottom respectively of the horizontal slot in the housing, the thickness of the slot being slightly greater than the thickness of the angle locator plate, the slot extending into the housing a distance slightly greater than the distance from the edge of the universal shaft to the outside edge of the angle locator plate, the slot being the same distance above the clevis of the universal assembly as the angle locator plate, the angle locator plate being inserted in the slot, the housing being mounted with the row of infrared emitters and the row of infrared sensors being aligned with the axis of the universal shaft, with the spacing and positioning of the infrared emitters and infrared sensors matching the pattern of hole positions in each angle locator plate;
- (d) means for computing, printing and plotting the vertical and horizontal angles between the direction of the force applied by the cat head and the longitudinal axis of the tong using electrical signals from the infrared sensors which are energized corresponding to the hole pattern of the angle locater plate.

5. A drill string make-up and breakout torque control system and apparatus as recited in claim 4 wherein the means for connecting the tong to the vertical and horizontal angle measuring means is designed for use with a tong with a rectangular loop type handle, and comprises a tong bracket which is an "L" shaped rectangular block, with the base of the bracket having a width only slightly less than the width of the inside of the loop of the tong handle and a thickness only slightly less than the depth of the inside of the loop of the tong handle so that the base of the bracket will fit snugly when it is inserted into the tong handle, the base having a horizontal hole perpendicular to its longitudinal axis extending through the base and positioned such that when the base is inserted in the handle of the tong, the hole in the base lines up with the hole which extends along the longitudinal axis of the tong from the outside of the handle loop through the handle into the shaft of the tong, the hole in the bracket base being the same diameter as the hole in the outer portion of the tong handle so that a bolt can be inserted through the handle and the base of the bracket and threaded into the shaft of the tong securing the bracket in place, the stem of the bracket having a horizontal hole perpendicular to the longitudinal axis of the stem extending through the stem which hole is interiorly threaded on the side opposite the base and enlarged on the same side as the base to allow a bolt head to be countersunk in the stem, a portion of the face of the side of the stem opposite the base on the end away from the base being recessed with the length of the recessed portion being approximately equal to the width of the clevis of the universal assemblies, the hole being positioned near the center of the recessed portion of the face of the bracket stem, and a threaded bolt threaded into the hole to secure the universal assemblies to the bracket, the recessed portion of the face of the stem mating with the clevis of the universal assembly which is attached to the bracket and thereby providing rotational stability for the universal assemblies, the stem also having a vertical hole extending through the stem on the opposite end for the attachment of a clevis or bracket for a snub line.

6. A drill string make-up and breakout torque control system and apparatus as recited in claim 4, wherein the means for connecting the tong to the vertical and horizontal angle measuring means is designed for use with a tong with a double prong type handle, and comprises a tong bracket which comprises:

(a) a bottom assembly plate which is an L-shaped block with a tapered groove in the top of the base, the axis of which groove is perpendicular to the longitudinal axis of the base and parallel to the longitudinal axis of the stem the groove having a semi-circular cross-section, and the groove matching the taper of the tong handle adjacent to the end prongs in pitch and cross-section the width of the stem being no greater than the longitudinal space between the prongs of the tong handle, interiorly threaded vertical bolt holes on each side of the groove, the plate having a vertical hole extending through the stem near the base for the attachment of a snub line cable, the stem having a horizontal hole perpendicular to the longitudinal axis of the stem extending through the stem near the opposite end of the stem interiorly threaded on the side opposite the base and enlarged on the side adjacent to the base to allow a bolt head to be countersunk in the stem, the end of the face of the stem opposite the base being recessed with the length of the recessed portion being approximately equal to the width of the clevis of the universal assemblies, the hole being positioned near the center of the recessed portion of the bracket stem, and a threaded bolt threaded into the hole to secure the universal assemblies to the bracket, the recessed portion of the face of the stem mating with the clevis of the universal assembly which is attached to the bracket and thereby providing rotational stability for the universal assemblies;

(b) a top assembly plate, rectangular solid in shape, with the same width as the base of bottom assembly plate and having a tapered groove for the tong handle which is a mirror image of the groove in the bottom assembly plate, and having two interiorly threaded vertical bolt holes which are aligned with the holes in the bottom assembly plate; and (c) two threaded bolts for securing the lower assembly plate to the upper assembly plate so that the tong bracket may be affixed to the tong handle.

7. A drill string make-up and breakout torque control apparatus for use with a cat head system, including clutch operated drum and cable for force generation, and a tong for force application, said apparatus comprising:

(a) force measuring means for measuring the instantaneous force applied to said tong;

(b) angle measuring means for measuring the instantaneous vertical and horizontal angles between the direction of said instantaneous force and the longitudinal axis of said tong;

(c) connecting means for connecting said force measuring means and said angle measuring means to said tong;

(d) torque computing means for computing the torque applied to the drill string by said tong, based on electronic input from said force measuring means and said angle measuring means;

(e) time interval computing means for computing a shutdown time interval within which a pre-determined maximum torque will be achieved, based on input from said torque computing means; and (f) clutch disengaging means for disengaging said clutch operated drum, based on input from said time interval computing means.

8. A drill string make-up and breakout torque control apparatus as recited in claim 7, wherein said force measuring means comprises:

(a) a hydraulic load cell;

(b) an electronic pressure transducer for measuring the internal hydraulic pressure of said load cell; and (c) force computing means for computing said instantaneous force based on input from said pressure transducer.

9. A drill string make-up and breakout torque control apparatus as recited in claim 8, further comprising display means for displaying said instantaneous force and said instantaneous vertical and horizontal angles.

10. A drill string make-up and breakout torque control apparatus as recited in claim 9, wherein said display means further comprises a printer and plotter.

11. A drill string make-up and breakout torque control apparatus as recited in claim 9, wherein said display means further displays the date and time at which said clutch operated drum is disengaged.

* * * * *